US008005672B2

(12) United States Patent
Vierthaler et al.

(10) Patent No.: US 8,005,672 B2
(45) Date of Patent: Aug. 23, 2011

(54) CIRCUIT ARRANGEMENT AND METHOD FOR DETECTING AND IMPROVING A SPEECH COMPONENT IN AN AUDIO SIGNAL

(75) Inventors: Matthias Vierthaler, Denzlingen (DE); Florian Pfister, Endingen (DE); Dieter Luecking, Freiburg (DE); Stefan Mueller, Freiburg (DE)

(73) Assignee: Trident Microsystems (Far East) Ltd., Grand Caymen (KY)

( * ) Notice: Subject to any disclaimer, the term of this patent is extended or adjusted under 35 U.S.C. 154(b) by 710 days.

(21) Appl. No.: 11/249,020

(22) Filed: Oct. 11, 2005

(65) Prior Publication Data

US 2006/0080089 A1 Apr. 13, 2006

(30) Foreign Application Priority Data

Oct. 8, 2004 (DE) ........................ 10 2004 049 347

(51) Int. Cl.
*G10L 15/20* (2006.01)

(52) U.S. Cl. .......... 704/233; 704/E11.003; 704/E21.002

(58) Field of Classification Search .................. 704/233, 704/E11.003, E21.002
See application file for complete search history.

(56) References Cited

U.S. PATENT DOCUMENTS 4,410,763 A * 10/1983 Strawczynski et al. ........ 704/214
4,698,842 A * 10/1987 Mackie et al. .................... 381/1
5,251,263 A * 10/1993 Andrea et al. ............... 381/71.6
5,430,826 A 7/1995 Webster et al.
5,479,560 A 12/1995 Mekata ........................ 395/2.18
5,553,151 A 9/1996 Goldberg ..................... 381/68.4
5,611,019 A * 3/1997 Nakatoh et al. ............... 704/233
5,732,392 A * 3/1998 Mizuno et al. ................ 704/233
5,878,391 A * 3/1999 Aarts ............................ 704/233
5,963,901 A 10/1999 Vähätalo et al.
6,009,396 A * 12/1999 Nagata .......................... 704/270
6,031,915 A 2/2000 Okano et al.
6,130,949 A * 10/2000 Aoki et al. ................... 381/94.3
6,216,103 B1 * 4/2001 Wu et al. ........................ 704/253
6,230,122 B1 * 5/2001 Wu et al. ........................ 704/226
6,415,253 B1 * 7/2002 Johnson ......................... 704/210
7,167,568 B2 * 1/2007 Malvar et al. .................. 381/66
(Continued)

FOREIGN PATENT DOCUMENTS

EP 785419 A2 * 7/1997
(Continued)

OTHER PUBLICATIONS

T. Lotter, C. Benien, and P. Vary, "Multichannel Direction-Independent Speech Enhancement Using Spectral Amplitude Estimation," EURASIP Journal on Applied Signal Processing, vol. 11, pp. 1147-1156, 2003.*

(Continued)

*Primary Examiner* — Richemond Dorvil
*Assistant Examiner* — Greg Borsetti
(74) *Attorney, Agent, or Firm* — O'Shea Getz P.C.

(57) ABSTRACT

An audio processing system includes a speech detector that receives and processes an audio input signal to determine if the input signal includes components indicative of speech, and provides a control signal indicative of whether or not the audio input signal includes speech. A speech processing device receives the audio input signal and processes the audio input signal to improve its quality if the control signal indicates that the audio input signal includes speech.

19 Claims, 4 Drawing Sheets

U.S. PATENT DOCUMENTS

| | | | | |
|---|---|---|---|---|
| 7,174,022 | B1 * | 2/2007 | Zhang et al. | 381/92 |
| 7,343,284 | B1 * | 3/2008 | Gazor et al. | 704/226 |
| 2001/0001141 | A1 * | 5/2001 | Sih et al. | 704/231 |
| 2001/0001142 | A1 * | 5/2001 | Ehara et al. | 704/233 |
| 2002/0120440 | A1 * | 8/2002 | Zhang | 704/215 |
| 2002/0152066 | A1 * | 10/2002 | Piket | 704/226 |
| 2002/0161577 | A1 * | 10/2002 | Smith | 704/233 |
| 2002/0169602 | A1 * | 11/2002 | Hodges | 704/211 |
| 2002/0173950 | A1 | 11/2002 | Vierthaler | 704/208 |
| 2002/0188442 | A1 * | 12/2002 | Gass et al. | 704/208 |
| 2003/0044032 | A1 * | 3/2003 | Irwan et al. | 381/307 |
| 2003/0055627 | A1 * | 3/2003 | Balan et al. | 704/200.1 |
| 2003/0055636 | A1 * | 3/2003 | Katuo et al. | 704/225 |
| 2003/0144840 | A1 * | 7/2003 | Ma et al. | 704/249 |
| 2004/0071130 | A1 * | 4/2004 | Doerr et al. | 370/352 |
| 2004/0078199 | A1 * | 4/2004 | Kremer et al. | 704/233 |
| 2004/0175001 | A1 | 9/2004 | Sakagami et al. | |
| 2005/0143989 | A1 * | 6/2005 | Jelinek | 704/226 |

FOREIGN PATENT DOCUMENTS

| | | | |
|---|---|---|---|
| JP | 2002149176 | 5/2002 | |
| KR | 2004-34705 | 4/2004 | 20/10 |
| WO | 03022003 | 3/2003 | |
| WO | WO 2004/071130 | 8/2004 | |

OTHER PUBLICATIONS

Pfau, T., Ellis, D.P.W., and Stolcke, A., "Multispeaker Speech Activity Detection for the ICSI Meeting Recorder", Proc. IEEE Automatic Speech Recognition and Understanding Workshop, 2001.*

S. Doclo and M. Moonen, "GSVD-based optimal filtering for single and multimicrophone speech enhancement," IEEE Trans. Signal Processing, vol. 50, No. 9, pp. 2230-2244, 2002.*

S. F. Boll, "Suppression of Acoustic Noise in Speech Using Spectral Subtraction", IEEE Trans. Acousfics, Speech and Signal Processing, vol. 27, 1979, pp. 113-120.*

* cited by examiner

CIRCUIT ARRANGEMENT AND METHOD FOR DETECTING AND IMPROVING A SPEECH COMPONENT IN AN AUDIO SIGNAL

PRIORITY INFORMATION

This patent application claims priority from German patent application 10 2004 049 347.2 filed Oct. 8, 2004, which is hereby incorporated by reference.

BACKGROUND OF THE INVENTION

The invention relates to the field of audio signal processing and in particular to the field of detecting and processing speech.

U.S. Patent Application 2002/0173950 discloses a circuit arrangement for improving the intelligibility of audio signals containing speech, in which frequency and/or amplitude components of the audio signal are altered according to certain parameters. The audio signal is amplified by a predetermined factor in a processing section and output through a high-pass filter, while an edge frequency of the high-pass filter may be regulated so that the amplitude of the audio signal after the processing section is equal or proportional to the amplitude of the audio signal before the processing section. This circuit arrangement proposes to attenuate the ground wave of the speech signal, which contributes relatively little to the intelligibility of the speech components therein, yet possesses the greatest energy, while the remaining signal spectrum of the audio signal is correspondingly emphasized. Furthermore, the amplitude of vowels, which have a large amplitude at low frequency, may be reduced to a vowel in the transitional region of a consonant which has a low amplitude at high frequency, in order to reduce so-called "backward masking." For this, the entire signal is emphasized by the factor. Finally, high-frequency components are emphasized and the low-frequency ground wave is reduced to the same degree so that the amplitude or energy of the audio signal remains unchanged.

U.S. Pat. No. 5,553,151 describes a "forward masking". Here, weak consonants overlap in time with preceding strong vowels. A relatively fast compressor with an "attack time" of approximately 10 msec and a "release time" of approximately 75 to 150 msec is proposed.

U.S. Pat. No. 5,479,560 discloses dividing an audio signal into several frequency bands and amplifying relatively strongly those frequency bands with large energy and reducing the others. This is proposed because speech includes a succession of phonemes. Phonemes include a plurality of frequencies. These are especially amplified in the region of the resonance frequencies of the mouth and throat. A frequency band with such a spectral peak value is known as a formant. Formants are especially important for recognition of phonemes and, thus, speech. One principle of improving the intelligibility of speech is to amplify the peak values or formants of the frequency spectrum of an audio signal and attenuate the errors coming in between. For an adult man, the fundamental frequency of speech is approximately 60 to 250 Hz. The first four formants assigned are at 500 Hz, 1500 Hz, 2500 Hz, and 3500 Hz.

Such circuit arrangements and procedure make speech contained in an audio signal more understandable than other components contained in the audio signal. But at the same time, signal components not containing speech are also altered or distorted. Another drawback to the methods and circuit arrangements is that these continuously improve or process rigidly fixed speech components, frequency components, or the like. Thus, signal components not containing speech are also altered or distorted at times when the audio signal contains no speech or speech components.

Therefore, there is a need for a technique that processes speech within an audio signal while reducing the altering and distortion of the audio signal component not containing speech.

SUMMARY OF THE INVENTION

According to an aspect of the invention, speech components contained in an audio signal are detected and a control signal indicative of the presence of speech is generated and provided to a speech processing device. The speech processing device also receives the audio signal and processes the audio signal to improve its quality if the control signal indicates that the audio signal includes speech.

The technique of the present invention may be implemented prior to actual signal processing to improve the intelligibility of audio signals containing speech. Accordingly, the audio signal received and entered is first investigated to find out whether it even contains speech or speech components. Depending on the outcome of the speech detection, a control signal is then output, which is used by the speech processing device as a control signal. During the speech processing to improve the speech components in the audio signal relative to other signal components in the audio signal, a processing or altering of the audio signal is only done when speech or speech components are actually present.

The control signal is used as a trigger signal for the actual speech improvement. In this way, the speech improvement can be done by detection or analysis of a preceding audio signal or the like, possibly a time-delayed audio signal.

The circuit arrangement which generates and provides the control signal can be provided as an independent structural component, but it can also be integrated with the speech processing device or speech improvement device as a single component. In particular, the circuit arrangement for detection of speech and the speech processing device for improving the speech components of the audio signal can be part of an integrated circuit. A method for detection of speech and the speech processing method for improving speech components in the audio signal according to the present invention can also be carried out separately from each other, or in the same device.

The speech detector may include a threshold value determining device for comparing a range of detected speech components to a threshold value and for outputting the control signal depending on the result of the comparison.

The speech detector may receive at least one parameter for the variable controlling of the detection in regard to a range of speech components being detected and/or in regard to a frequency range of speech components being detected.

The speech detector may include a correlation device for performing a cross correlation or an autocorrelation of the audio signal or components of the audio signal.

The speech detector may be configured to process a multi-component audio signal, such as for example a stereo audio signal or multi-channel audio signal, with several audio signal components, and it is configured or controlled as a processing device for detection of speech by a comparison or a processing of the components among each other.

The speech detector may include a direction determining device for determining a direction of common signal components of the different components.

The speech detector may include a frequency-energy detector for determining signal energy in a voice frequency range in relation to other signal energy of the audio signal.

The speech detector may be configured and/or controlled to output the control signal depending on results of both the frequency-energy detector and the correlation device, the comparison device, or the direction determining device.

The control signal is configured and/or controlled to activate or deactivate the speech improvement device and/or the speech improvement method depending on the speech content of the audio signal.

The components of a multi-component audio signal with several components may be compared to each other or processed with each other for detection of the speech. In this context, "components" are understood to mean signal components from different distances and directions and/or signals of different channels.

The audio signal components may be compared or processed with respect to common speech components in the different audio signal components, especially to determine a direction of the common signal components. Due to different arrival times at the right and left channel of a stereo signal, for example, and specific attentions of special frequencies, one can determine the distance and direction of the speech component. In this way, the speech improvement can be applied only to speech components that are recognized to come from a person standing close to the microphone. Signal components or speech components from distant persons can be ignored, so that a speech improvement is only activated when a nearby person is actually speaking.

Energy of the audio signal may be determined in a voice frequency range in relation to another signal energy of the audio signal. Thus, it is geared to the energy of frequency components that are typical of spoken speech. Besides individual attuning to, for example, a man's, a woman's or a child's speech as the criterion for the audio frequency range being selected, the comparison of the corresponding energy is preferably made in terms of the energy of the other signal components of the audio signal with other frequencies or in terms of the energy content of the overall audio signal component. In particular, speech from speaking persons standing at a distance, which might not be of interest to the listener, can be recognized and result in deactivation of the speech improvement when no nearby person is speaking.

The control signal is provided to activate or deactivate the speech improvement.

A frequency response is determined by FIR (finite impulse response) or IIR (infinite impulse response) filter.

The signal components of the audio signal may be separated by a matrix.

Coefficients for the matrix may be determined via a function dependent on the speech component. The function is linear and constant. As an alternative or in addition, the function has a hysteresis.

The signal components with speech components of the audio signal can be analyzed and detected using various criteria. For example, besides a minimum duration where speech is detected as a speech component, one can also use the frequency of detectable speech and/or the direction of a speech source of detected speech as the signal component. The terms signal components and speech components should therefore be construed generally and not restrictively.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
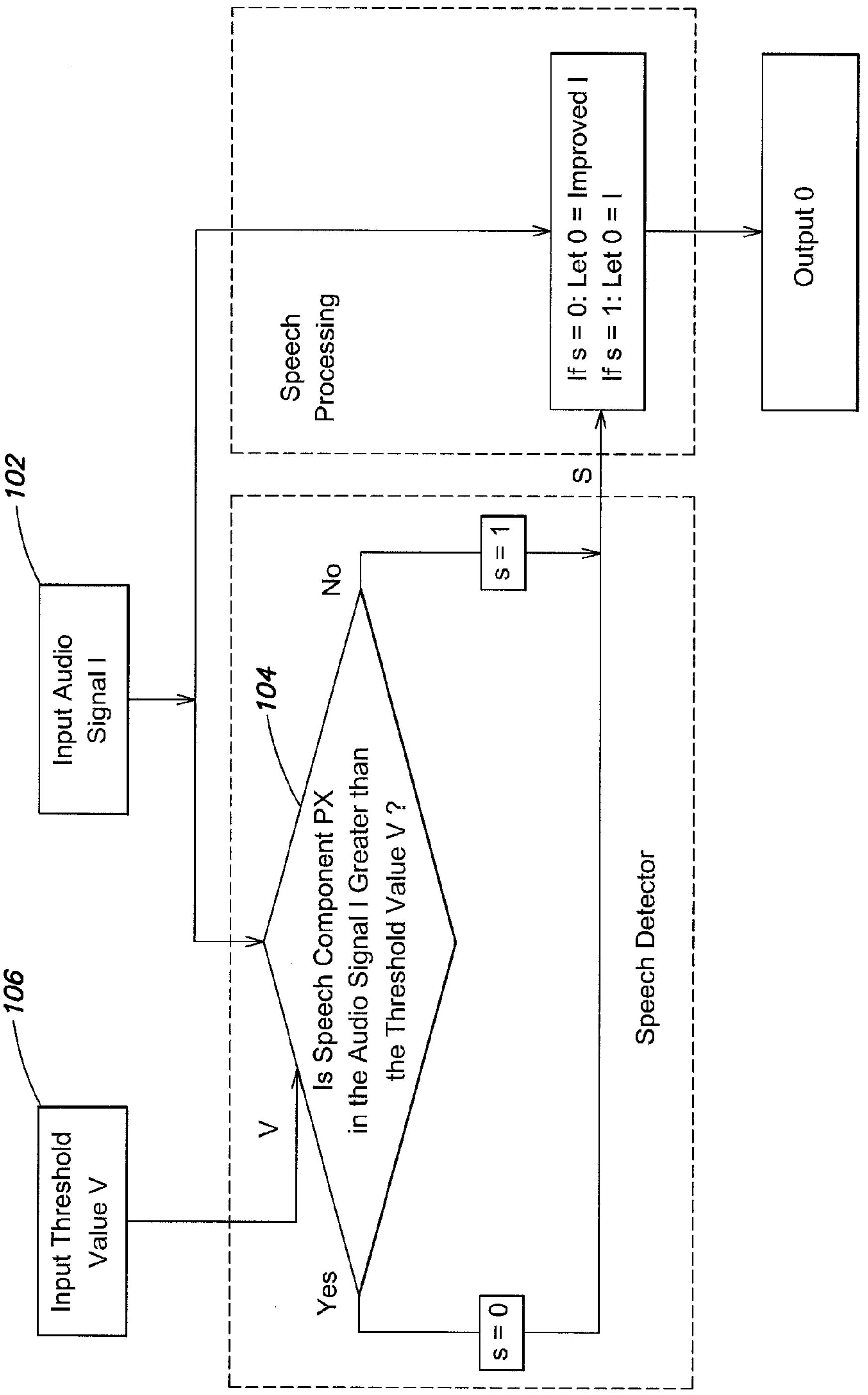
FIG. 1 illustrates, schematically, method steps or components of a method or a circuit arrangement for processing an audio signal for detection of speech contained therein.

FIG. 1 is a flow chart illustration of processing to detect speech within an audio signal. In step 102, an audio signal I is received possibly containing speech or speech components PX. The audio signal I may be for example a single-channel monosignal, a multi-component audio signal from stereo audio signal source or the like (i.e., a stereo audio signal), a 3D stereo audio signal with an additional central component or a surround audio signal with the presently standard five components for audio signal components of right, left, and middle, as well as two remote sources right and left.

The audio signal I may be input to a speech detector. The speech detector investigates whether speech or a speech component PX is contained in the audio signal I. Step 104 determines whether detected speech or speech component PX within the input signal I are larger than a correspondingly assigned threshold value V. The threshold value may be input in step 106. The detection parameters, and especially the threshold value V, may be adapted as necessary.

Where step 104 determines that a sufficient speech component PX is contained in the audio signal I, a control signal S will be set at the value 0, for example. Otherwise, the control signal will be set at the value 1, for example. The control signal S is output from the speech detector for further use in a speech processor.

Where the control signal indicates that a speech component is within the audio signal, the speech processor is activated to improve the speech or speech components PX. The audio signal I currently entered in the speech processor is improved by known processing techniques, to provide an audio output signal O that is equal to the improved signal. Where no sufficient speech component PX is detected in the step 104 (i.e., if s=1), the audio signal I entered into the speech processor is left alone, i.e., the audio output signal O is output as the input signal I.

Where a time delay is caused by the speech detection in the control signal entering the speech processor as compared to the currently entered audio signal I, a delay may be added corresponding to the time delay for the speech detection.

Significantly, the technique of the present invention applies a speech improvement only to parts of the audio signal which actually contain speech or that actually contain a particular speech component in the audio signal. Thus, the speech detection detects speech separated from the remaining signal.

In reality, speech cannot be mathematically separated with precision from other signal components of an audio signal.

Therefore, the goal is to furnish the best possible estimate value. Where algorithms or circuit arrangements of consecutively implemented embodiments result in error due to other corresponding signal components, nonetheless a beneficial improvement of an output audio signal will be achieved. One should make sure that the audio signal I is not distorted too much by faulty detection in the speech detector.

Figure 2:
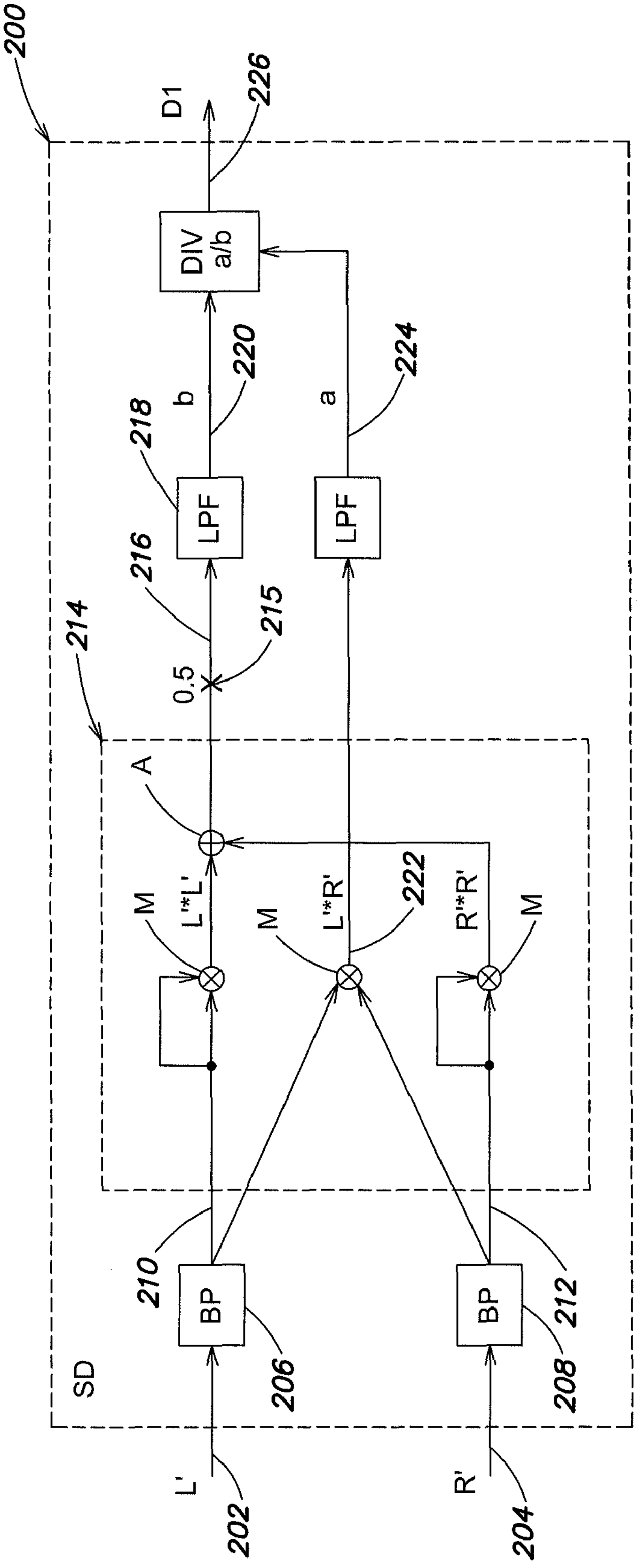
FIG. 2 illustrates a circuit arrangement according to a first embodiment for application of a correlation to speech components of different signal components.

FIG. 2 is a schematic illustration of a speech detector 200. The speech detector 200 receives an audio signal component or an audio signal channel L', R' of a stereo audio signal on lines 202, 204, respectively. The two audio signal components L', R' are each input to an associated band pass filter 206, 208 respectively for band limiting. The bandpassed signals on lines 210, 212 are input to a correlation device 214, which performs a cross correlation. In the correlation device 214, each of the bandpassed signals are squared, and the resultant products are summed, and the resultant summed signal is output on a line 215. The signal on the line 215 is multiplied by a factor 0.5 to reduce the amplitude, and output on a line 216. The signal on the line 216 is then input to a low-pass filter 218, which provides a filtered signal on a line 220.

The signals on the lines 210, 212 are also multiplied together to provide a signal L, *R' that is output on a line 222. The signal on the line 222 is input to a low-pass filter and the resultant filtered signal is output on a line 224.

The signal on the line 224 is divided by the signal on the line 220, and the resultant signal (a/b) is output on a line 226 as a control signal or as a precursor D1 of the control signal S.

With such a circuit arrangement or a corresponding processing method, a cross correlation is performed. A standard stereo audio signal L', R' as the audio signal I generally includes several audio signal components R, L, C, S. In the case of a multi-channel audio signal, these components can also be furnished separately.

In the case of a stereo audio signal L', R', the two audio signal channels U, R' may be described by:

$$a{:}L'=L+C+S \text{ and}$$

$$b{:}R'=R+C-S,$$

where L stands for a left signal component, C for a central signal component arriving from the front, S for a surround signal component (i.e., a signal from the rear) and R for a right signal component.

Speech or speech components PX are mainly located on the central channel or in the central component C. This circumstance can be used to detect the component of speech or speech components PX from the remaining signal content of the audio signal I. The contained speech or the contained speech component PX in relation to the remaining signal components of the audio signal I may be determined according to:

$$PX=2*RMS(C)/((RMS/L')+RMS(R'))$$

with RMS as the time-averaged amplitude.

By a cross correlation, one can determine the share of the central component C by:

$$L'*R'=L*R+L*C+R*C-L*S+R*S+C*C-S*S.$$

In the time average, all uncorrelated products become zero for DC-free signals, that is, for signal components without a direct current voltage share. Thus, the criterion for the signal D1 output on the line 226 of the speech detector 200 can be:

$$D1=2*LPF(L'*R')/(L'*L'+R'*R')=2*LPF(C*C-S*S)/LPF(L'*L'+R'*R').$$

LPF indicates low-pass filtering. One therefore gets D1=1 as the value for the output signal D1 on the line 226, which may be used as the precursor of the control signal S or directly as the control signal S, where the audio signal I includes solely a central component C. D1 is equal to zero if the audio signal I includes solely of the uncorrelated right and left signal components L, R. One gets D1=−1 where the audio signal I includes solely of surround components S. For a mixture of the different components, such as occurs in a real signal, one gets values of D1 between −1 and +1. The closer the output signal or the output value D1 lies to +1, the more the audio signal I or L', R' is center-loaded, thus there is a correspondingly large speech component PX.

The time constant of the low-pass filter LPF may lie in the range of approximately 100 ms, where a very fast response to changing signal components is desired. However, the time constant may be extended up to several minutes, where a very slow response of the speech detector is desired. Therefore, the time constant of the low-pass filter is preferably a variable parameter. Before performing a detection algorithm, it is advisable to filter out DC components with an appropriate filter, especially a DC-notch filter. Further band limiting is optional.

Figure 3:
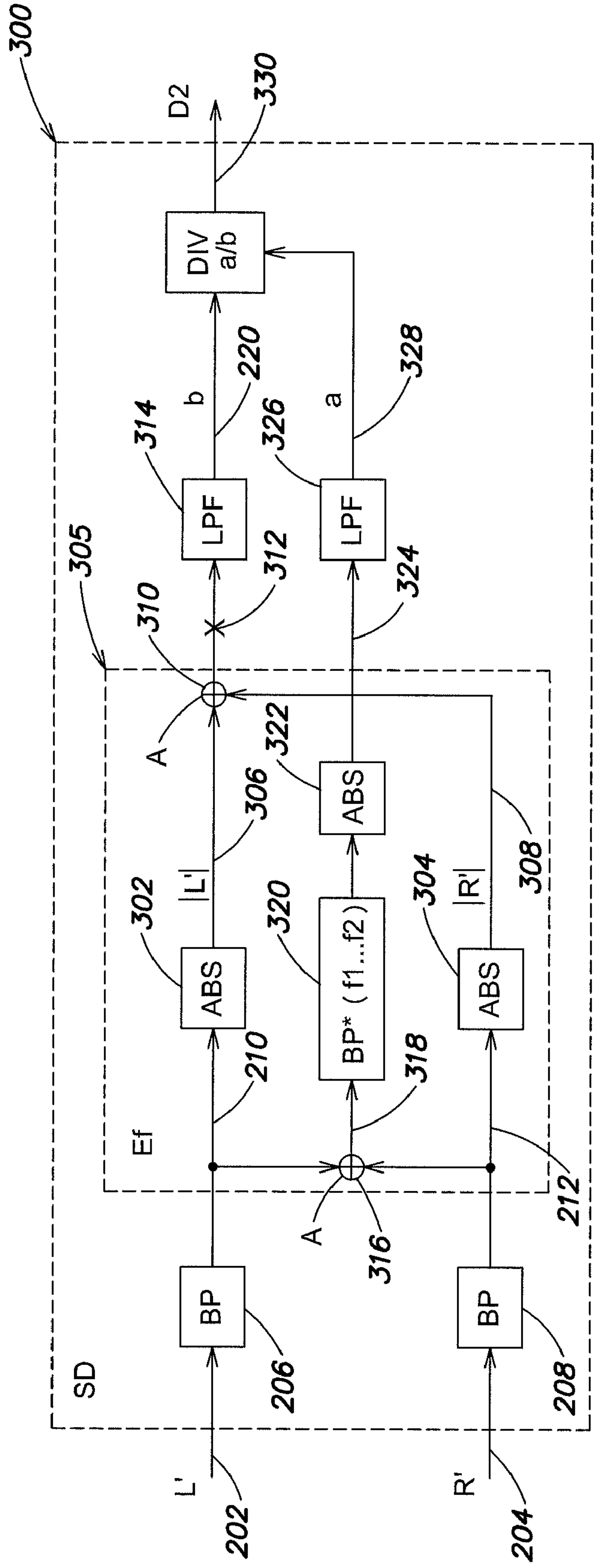
FIG. 3 illustrates another exemplary circuit arrangement to illustrate a determination of energy in a voice frequency range.

FIG. 3 illustrates an alternative embodiment of a speech detector 300. Hereafter, only those components will be described, making reference to the description of FIG. 2, that are different from the detector illustrated in of FIG. 2.

The bandpassed signals on lines 210, 212 are input to an associated energy determining component ABS 302, 304, respectively, of a frequency-energy detector 305 to determine the energy content. Speech has its greatest energy at frequencies between 100 Hz and 4 kHz. Accordingly, to determine the speech component PX, one can determine the proportion of energy in the voice frequency range f1 . . . f2 as compared to the overall energy of the audio signal I or L', R'.

The enemy determining components ABS 302, 304 in the most elementary case are units that output the absolute magnitude of a value presented at its input. The energy determining components 302, 304 provide output signals on lines 306, 308.

The output values of the energy determining components ABS 302, 304 are input to a summer 310, and the resultant sum on a line 312 is input to a first low-pass filter 314. The bandpassed signals on lines 210, 212 are summed by a summer 316, and the resultant sum is output on a line 318, and input to a bandpass filter 320. The bandpass filter 320 has a pass band that passes those signal components which lie in the voice frequency range f1 . . . f2. The bandpass filter provides output signal that is input to an energy determining component 322 (e.g., a magnitude detector), which provides a signal on a line 324. The signal on the line 324 is input to a low pass filter 326 which provides a signal on line 328, which is divided by the signal output by the low pass filter 314 to provide an output signal D2 on line 330 as the control signal or a precursor of the control signal.

The output signal D2 can be calculated by:

$$D2=2*RMS(BP(f1 \ldots f2)(L'+R'))/(RMS(L')+RMS(R')).$$

The closer the output value or the output signal D2 lies to the value 1, the more energy is present in the voice frequency range, thus the speech component PX is large. The initial band limiting of the input signal L', R', again, is optional.

In one embodiment, the systems of FIGS. 2 and 3 may be combined. For example, the criterion can be:

$$D3=D1*D2.$$

Thus, speech or a speech component PX is recognized when more energy is present in the central component C of the audio signal and more energy is present in the voice frequency range.

In a further embodiment, another stage may be placed after the described circuit arrangements for furnishing the control signal. Where the output signals D1, D2, D3 of the described techniques exceed the threshold value v, the control signal may be switched to an active state.

Figure 4:
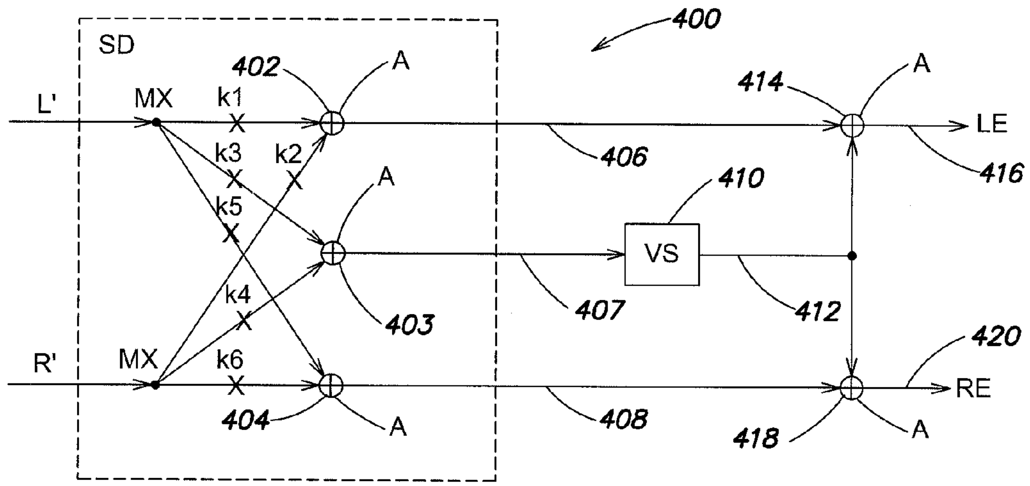
FIG. 4 illustrates an exemplary circuit arrangement to represent a matrix calculation before carrying out a speech improvement of the audio signal.

In parallel or consecutive voice signal processing of the audio signal I, the goal is to send as many signal components containing speech or speech components PX as possible through speech improvement processing and leave the remaining signal components unchanged, as is also described with reference to FIG. 1. This may be accomplished by a matrix 400, as shown in FIG. 4. Matrix coefficients k1, k2, . . . , k6 are determined depending on the particular speech component PX or depending on the output value or output signal D1, D2 output by the speech detector as the function PX=F(D1, D2).

The actual speech improvement processing may be provided in familiar fashion. For example, a simple frequency response correction may be carried out, as described in commonly assigned U.S. Patent Application U.S. 2002/0173950, which is hereby incorporated by reference. But other known processing techniques to improve the intelligibility of speech may also be used.

During the matrix processing illustrated in FIG. 4, the input components or input channels U, R' of the audio signal I are each multiplied by three factors k1, k3, k5 and k2, k4, k6, respectively, and the resultant products are input to various summers 402-404. The signal of the first channel L' multiplied by the first coefficient k1 and the signal of the second channel R' multiplied by the second coefficient k2 is presented to summer 402, which provides a summed signal on line 406. The signal of the first channel L' multiplied by the third coefficient k3 and the signal of the second channel R' multiplied by the fourth coefficient k4 are input to the second summer 403, which provides a signal on line 407. The signal of the first channel L' multiplied by the fifth coefficient k5 and the signal of the second channel R' multiplied by the sixth coefficient k6 are input to the third summer 404, which provides a signal on line 408. The output signal on the line 407 is input to a speech improvement circuit 410, which provides an output on line 412. The output signal on the line 412 is summed with the signal on the line 406 by a summer 414 that provides a left output LE on line 416. Summer 418 sums the signal on the lines 408, 412 and provides a second output channel RE on line 420.

To determine the coefficients, consider for example, that the speech component PX may be determined by the described technique by a range of values of $0 \leqq P \leqq 1$ in particular, and as a function of certain speech components with PX=F(D1,D2,D3). According to one simple variant, the coefficients may be established by:

$$k1=k6=1-PX/2;$$

$$k2=K5=-PX/2; \text{ and}$$

$$k3=k4=PX/2.$$

The last two signal channels or components LE, RE output correspond to the processed signals, which are taken to the output O for the processed audio signal.

Figure 5:
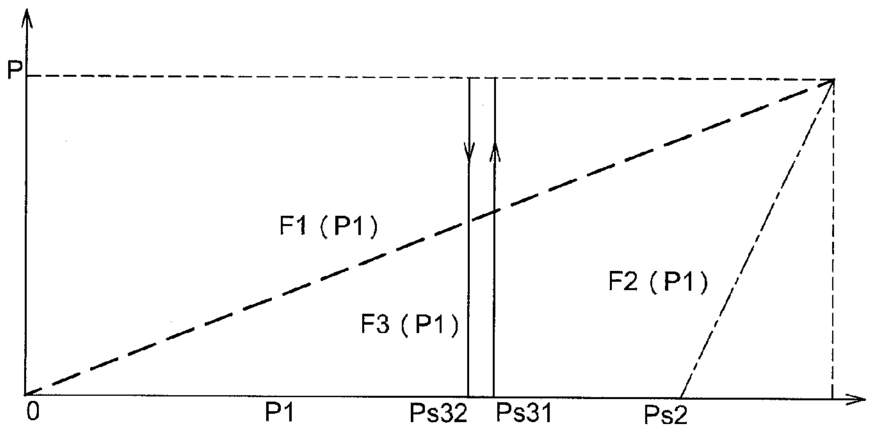
FIG. 5 is a diagram to illustrate criteria for establishing a threshold value.

FIG. 5 illustrates, for example, the function F(D1, D2=0, D3=0). In the case of the first function F=F1(D1) shown, the circuit arrangement already responds to a slight detected speech component. The probability of a wrong detection is relatively high for small values of D1. In any case, thanks to the constant trend of the first function F1(D1), the impact of the speech processing on the audio signal is relatively slight when D1 is small, so that any impairment of the audio signal is hardly perceived.

In the case of a second function F2(D1), the audio signal remains unaffected up to a threshold value v=Ps2. Accordingly, the effects on the audio signal during changes in the values of P1 are greater.

In the case of a third function F=F3(D1), the processing is switched on when a particular threshold value V=Ps31 is exceeded and switched off below another, lower threshold value V=Ps32. By incorporating such a hysteresis, a continual switching in the transitional region is prevented.

Although the present invention has been illustrated and described with respect to several preferred embodiments thereof, various changes, omissions and additions to the form and detail thereof, may be made therein, without departing from the spirit and scope of the invention.

What is claimed is:

1. An audio signal processing circuit, comprising:

a speech detector that receives a multi-component audio signal including at least a left signal component and a right signal component, and provides a control signal indicative of whether the received audio signal contains speech, wherein the speech detector combines the left and the right signal components to provide a combined signal component and comprises a processing device that detects speech by comparing and processing the combined signal component, the left signal component and the right signal component; and a speech processor that receives the multi-component audio signal and the control signal, and modifies the received multi-component audio signal if the control signal indicates that the received multi-component audio signal contains speech and provides a processed modified multi-component audio signal that includes (A) a modified left signal component that comprises the sum of (i) the left signal component multiplied by a first factor K1 and (ii) the right signal component multiplied by a second factor K2, and (B) a modified right signal component that comprises the sum of (i) the left signal component multiplied by a third factor K3 and (ii) the right signal component multiplied by a fourth factor K4, and provides the received multi-component audio signal if the control signal indicates that the received audio signal does not contain speech, where the values for K1, K2, K3 and K4 are set as a function of the control signal value;

where the speech processor comprises a speech improvement device configured to modify the speech component of the received audio signal.

2. The circuit of claim 1, where the speech detector compares a range of detected speech components to a threshold value and outputs the control signal depending on the result of the comparison.

3. The circuit of claim 2, where the speech detector receives at least one parameter (V) for variable controlling the speech detector with respect to at least one of a range of speech components being detected and a frequency range of speech components being detected.

4. The circuit of claim 1, where the speech detector comprises a correlation device that operates on the audio signal to provide the control signal.

5. The circuit of claim 1, where the multi-component audio signal is one of a stereo audio signal comprising the left and the right signal components, a 3D stereo audio signal comprising the left and the right signal components, and a center signal component, and a surround audio signal comprising the left and the right signal components, the center signal component, and a surround signal component.

6. The circuit of claim 5, where the speech detector comprises a direction determining device for determining at least one of a direction and a distance of common signal components of the different signal components (L, R, C, S).

7. The circuit of claim 1, where the speech detector comprises a frequency-energy detector for determining signal energy in a voice frequency range in relation to signal energy of the audio signal.

8. The circuit of claim 7, where the speech detector is at least one of configured and controlled to output the control signal depending on results of at least one of a comparison device, a direction determining device and both a frequency-energy detector and a correlation device.

9. The circuit of claim 1, where a frequency response is determined by at least one of a Finite Impulse Response filter and an Infinite Impulse Response filter.

10. The circuit of claim 1, where the signal components of the audio signal are separated by a matrix.

11. The circuit of claim 1, wherein the function is linear and constant.

12. The circuit of claim 1, wherein the function has a hysteresis.

13. A speech detecting and processing method for use with an audio signal processor, comprising:

receiving a multi-component audio signal including a left signal component and a right signal component;

combining the left and the right signal components to obtain a combined signal component;

detecting speech components in the received audio signal with the audio signal processor by at least one comparing to each other and processing with each other the left signal component, the right signal component and the combined signal component, and providing a control signal indicative of if the multi-component audio signal contains speech;

processing the received audio signal with the audio signal processor if the control signal indicates that the received audio signal contains speech by providing a processed modified multi-component audio signal that includes (A) a modified left signal component that comprises the sum of (i) the left signal component multiplied by a first factor K1 and (ii) the right signal component multiplied by a second factor K2, and (B) a modified right signal component that comprises the sum of (i) the left signal component multiplied by a third factor K3 and (ii) the right signal component multiplied by a fourth factor K4, and provides the received multi-component audio signal if the control signal indicates that the received audio signal does not contain speech, where the values for K1, K2, K3 and K4 are set as a function of the control signal value.

14. The method of claim 13, where the range of detected speech components is compared to a threshold value.

15. The method of claim 14, where the detection is carried out with regard to at least one of a range of speech components to be detected and a frequency range of the speech components to be detected and is adjustable by at least one variable parameter, the threshold value.

16. The method of claim 15, where at least one of a cross correlation and an autocorrelation of at least one of the multi-component audio signal, the left signal component, the right signal component and the combined signal component of the audio signal is performed.

17. The method of claim 13, where the combined signal component, the left signal component and the right signal component are at least one of compared and processed with respect to common speech components in the different audio signal components, to determine at least one of a direction and a distance of the common signal components.

18. The method of claim 17, where energy of the audio signal is determined within a voice frequency range (f1, . . . f2) in relation to energy of the audio signal in a different frequency range.

19. An audio processing system, comprising:

a speech detector that receives and processes a multi-component audio input signal including at least a left signal component and a right signal component to obtain a combined signal component, and comprises a processing device for at least one of comparing and processing the combined signal component, the left signal component and the right signal component among each another to determine if the audio input signal includes components indicative of speech, and provides a control signal indicative of whether or not the audio input signal includes speech;

a speech processing device that receives the audio input signal and processes speech components of the audio input signal to improve its quality if the control signal indicates that the audio input signal includes speech and provides a processed modified multi-component audio signal that includes (A) a modified left signal component that comprises the sum of (i) the left signal component multiplied by a first factor K1 and (ii) the right signal component multiplied by a second factor K2, and (B) a modified right signal component that comprises the sum of (i) the left signal component multiplied by a third factor K3 and (ii) the right signal component multiplied by a fourth factor K4, and provides the received multi-component audio signal if the control signal indicates that the received audio signal does not contain speech, where the values for K1, K2, K3 and K4 are set as a function of the control signal value; and an output coupled to the speech processing device, the output operable to output an audio output signal including at least one of the improved speech components of the audio input signal and substantially unaltered non-speech components of the audio input signal;

where the speech processing device further includes a speech improvement device configured to modify the speech component of the received audio input signal; and the control signal is at least one of configured and controlled to at least one of activate and deactivate the speech improvement device depending on the speech content of the audio signal.

* * * * *

UNITED STATES PATENT AND TRADEMARK OFFICE

CERTIFICATE OF CORRECTION

PATENT NO. : 8,005,672 B2
APPLICATION NO. : 11/249020
DATED : August 23, 2011
INVENTOR(S) : Vierthaler et al.

It is certified that error appears in the above-identified patent and that said Letters Patent is hereby corrected as shown below:

Column 3
Line 24, delete “attentions” and insert --attenuations--

Column 5
Line 37, delete “U, R'” and insert --L', R'--

Column 6
Line 37, delete “enemy” and insert --energy--

Column 7
Line 29, delete “U, R'” and insert --L', R'--

Signed and Sealed this
Fourth Day of October, 2011

David J. Kappos
*Director of the United States Patent and Trademark Office*